US012681138B2

(12) United States Patent
Sethuraman

(10) Patent No.: US 12,681,138 B2
(45) Date of Patent: Jul. 14, 2026

(54) UWB RADAR MEASUREMENT EVALUATION METHOD AND ARRANGEMENT

(71) Applicant: NXP B.V., Eindhoven (NL)

(72) Inventor: Prasanna Kumar Sethuraman, Bangalore (IN)

(73) Assignee: NXP B.V., Eindhoven (NL)

( * ) Notice: Subject to any disclaimer, the term of this patent is extended or adjusted under 35 U.S.C. 154(b) by 384 days.

(21) Appl. No.: 18/462,858

(22) Filed: Sep. 7, 2023

(65) Prior Publication Data

US 2024/0159864 A1 May 16, 2024

(30) Foreign Application Priority Data

Sep. 13, 2022 (IN) .............................. 202211052247
Jan. 16, 2023 (EP) ..................................... 23151836

(51) Int. Cl.
*G01S 7/292* (2006.01)
*G01S 7/03* (2006.01)
(Continued)

(52) U.S. Cl.
CPC ........... *G01S 7/2923* (2013.01); *G01S 7/038* (2013.01); *G01S 13/0209* (2013.01); *G01S 13/582* (2013.01)

(58) Field of Classification Search
CPC .... G01S 7/2923; G01S 7/038; G01S 13/0209; G01S 13/582
See application file for complete search history.

(56) References Cited

U.S. PATENT DOCUMENTS

2018/0180728 A1   6/2018  Shamain et al.
2021/0019342 A1*  1/2021  Peng ..................... G06F 16/583
(Continued)

OTHER PUBLICATIONS

Lazaro, A., "Vital signs monitoring using impulse based UWB signal", IEEE 2011 41st Microwave Conference (EUMC), Oct. 10, 2011.
(Continued)

*Primary Examiner* — William Kelleher
*Assistant Examiner* — Hailey R Le

(57) ABSTRACT

It is described a method of evaluating radar measurement data, the method comprising: forming plural subsequent channel impulse response profiles (14) from radar signals (6) across subsets of plural subsequent sample time intervals (15), the radar signals (6) being received due to reflection and/or interaction of plural UWB radar radiation pulses (3) transmitted towards a target (4); identifying, in each of the plural channel impulse response profiles (14), one of the plural sample time intervals (15) as a target sample time interval (16) in which received radar signals (6) are comprised originating due to reflection from the target (4); evaluating plural total radar signals of interest (17), each defined as respective magnitude and phase of the plural channel impulse response profiles (14) at the target sample time interval (16), in order to determine for at least one total radar signal of interest a phase ($\Phi$) of a target contribution (21) to the total radar signal of interest (17); determining location and/or movement information of the target (4) based at least on the at least one phase ($\Phi$) of the target contribution (21).

19 Claims, 6 Drawing Sheets

(51) Int. Cl.
  *G01S 13/02* (2006.01)
  *G01S 13/58* (2006.01)

(56) References Cited

U.S. PATENT DOCUMENTS

| | | | |
|---|---|---|---|
| 2021/0197834 A1 | 7/2021 | Shaker et al. | |
| 2022/0026531 A1 | 1/2022 | Wu et al. | |
| 2022/0171046 A1 * | 6/2022 | Zeng | G01S 13/04 |
| 2022/0365170 A1 * | 11/2022 | Va | G01S 7/40 |
| 2024/0119938 A1 * | 4/2024 | Wexler | G06F 21/32 |

OTHER PUBLICATIONS

Li, S., "Fine-Grained Respiration Monitoring During Overnight Sleep Using IR-UWB Radar", Lecture Notes of the Institute for Computer Sciences, Social-Informatics and Telecommunications Engineering, LNICST; ISSN 1867-8211; 18th EAI International Conference on Mobile and Ubiquitous Systems: Computing, Networking and Services, Mobitquitous 2, vol. 419, Nov. 8, 2021.

Ren, L., "Phase-Based Methods for Heart Rate Detection Using UWB Impulse Doppler Radar", IEEE Transactions on Microwave Theory and Techniques, vol. 64, No. 10, Oct. 2016.

Shao, W., "A Phase Shift and Sum Method for UWB Radar Imaging in Dispersive Media", IEEE Transactions on Microwave Theory and Techniques, Jan. 25, 2019.

* cited by examiner

UWB RADAR MEASUREMENT EVALUATION METHOD AND ARRANGEMENT

CROSS-REFERENCE TO RELATED APPLICATIONS

This application claims the priority under 35 U.S.C. § 119 of India patent application Ser. No. 202211052247, filed on 13 Sep. 2022, the contents of which are incorporated by reference herein.

FIELD OF THE DISCLOSURE

The present invention relates to a method and a corresponding arrangement of evaluating radar measurement data received upon transmission of UWB radar radiation pulses. Furthermore, the present invention relates to a method of performing a radar measurement and further relates to a radar measurement and evaluation equipment being configured to perform the method.

BACKGROUND OF THE DISCLOSURE

Ultra-wideband radar (UWB radar) involves to transmit narrow pulses of electromagnetic radiation (for example radio frequency radiation or microwave radiation), wherein the pulse width is for example in the range of 0.5 ns and 2 ns. Therefore, the transmitted radiation has an exceptional high bandwidth which is >500 MHz at a transmitted center frequency of 6-8 GHz. The large bandwidth of the UWB-radar requires antennas having an extremely wideband characteristic. The center frequency of the transmitted radiation may for example be between 6 GHz and for example 8 GHz.

Conventional UWB methods process the magnitude of a received radar signal having interacted with a target. The conventional methods thereby provide an accuracy of the distance estimation of a target depending on the sampling time. For example, with a 1 GHz sampling, the conventional methods allow for a measurement resolution of 15 cm for target distance determination. Although the accuracy of the distance estimate may be improved by interpolation of plural measurement signals, also the improvement is relatively limited. Thus, conventional methods and systems suffer from relatively poor distance determination of the target.

A UWB receiver that can complex baseband signals also has access to the phase of the received signal in addition to just the magnitude. It would be beneficial if the phase can be exploited to improve the accuracy of target estimation.

There are a few studies that exploit the phase information for specific purposes. For example: The paper by L. Ren, H. Wang, K. Naishadham, O. Kilic and A. E. Fathy, "Phase-Based Methods for Heart Rate Detection Using UWB Impulse Doppler Radar," in *IEEE Transactions on Microwave Theory and Techniques*, vol. 64, no. 10, pp. 3319-3331, Oct. 2016, doi: 10.1109/TMTT.2016.2597824, discloses techniques for detecting the phase variations of reflected signals of continuous wave radars to UWB pulse radars. The disclosed detection techniques reduce the impact of the interfering harmonic signals, thus improving the signal to noise ratio of the detected vital sign signals.

The preprint paper by Wenyi Shao, IEEE TRANSACTIONS ON MICROWAVE THEORY AND TECHNIQUES (https://arxiv.org/ftp/arxiv/papers/1908/1908.06855.pdf) discloses a phase-shift and sum algorithm to image objects in disperse media. Thereby, the phase-shift of the scattered field from the receiver to the source for each frequency component in an ultra-wideband (UWB) is compensated and then all the frequency responses are integrated.

SUMMARY OF THE DISCLOSURE

Thus, there may be a need for a method and a corresponding arrangement for evaluating radar measurement data wherein the distance determination accuracy of a target is improved compared to conventional methods and systems. Further, there may be a need for a method of performing a radar measurement and there may be a need of a system for performing a radar measurement, where conventional disadvantages are at least partly overcome.

The need may be satisfied by the subject-matter of the independent claims. The dependent claims specify particular embodiments of the present invention.

According to an embodiment of the present invention it is provided a method of evaluating radar measurement data, the method comprising: forming plural subsequent channel impulse response profiles from radar signals across subsets of plural subsequent sample time intervals, the radar signals being received due to reflection and/or interaction of plural UWB radar radiation pulses transmitted towards a target; identifying, in each of the plural channel impulse response profiles, one of the plural sample time intervals as a target sample time interval (e.g. referred to as target tap) in which received radar signals are comprised originating due to reflection from the target; evaluating plural total radar signals of interest, each defined as respective magnitude and phase of the plural channel impulse response profiles at the target sample time interval, in order to determine for at least one total radar signal of interest a phase of a target contribution to the total radar signal of interest; determining location and/or movement information of the target based at least on the at least one phase of the target contribution.

The method may not necessarily also involve to transmit and/or receive radar signals, for example using a transmitter and a respective radar receiver. Embodiments of the present invention may for example receive radar signals from other equipment which is not a feature or part of the method and the corresponding arrangement. The radar signals may for example be received at a processor which may for example execute a program which may be configured to carry out the method of evaluating the radar measurement data.

According to an embodiment of the present invention, a method of performing a radar measurement is provided wherein for transmitting plural UWB radar radiation pulses towards a target, a corresponding transmitter may be utilized. Furthermore, for receiving the radar signals due to reflection and/or interaction of the transmitted pulses at the target, a respective receiver may be utilized. The transmitter, the receiver and the processor may then form a system of performing a radar measurement which is provided according to another embodiment of the present invention.

The radiation pulses may for example be transmitted towards the target in a regular manner, for example temporarily spaced apart by a same time duration. The transmitted radar radiation pulses then interact and/or are being reflected from a target of which the distance (to the transmitter and/or or receiver) is to be analysed. The reflected radar signals may be received by a receiver antenna for example having a wideband characteristics.

The channel impulse response profiles (CIR profiles) are respectively formed by considering (for example averaging according to a code of the transmission of the pulses) the radar signals which are received from the target. Forming each of the channel impulse response profiles may reduce the noise comprised in the received radar signals. Each channel impulse response profile may for example be formed by considering (for example averaging) 100 to 10000 transmitted radar pulses and averaging across the received radar signals each being received due to reflection of the corresponding transmitted pulse from the target.

The radar signals emanating from the target due to the transmitted UWB radar radiation pulses may be measured for example using an I/Q demodulator, such that the in-phase and the quadrature components of the respective radar signals are determined. According to one embodiment of the present invention, the received radar signals may be given as a complex number, having a real part and an imaginary part, for example representing the in-phase component and the quadrature component, respectively. I/Q demodulation techniques are conventionally known. According to other embodiments, not all received radar signals are being measured including the in-phase and the quadrature components, but only radar signals of interest are measured involving determination of the in-phase component and the quadrature component.

Each of the channel impulse response profiles may cover a time duration comprising plural sample time intervals, the sample time intervals being the interval of sampling the received radar signals for example by an antenna. A target related received radar signal may be present in one of the sample time intervals, this sample time interval being referred to as target sample time interval (or target tap). The identification of the target time interval may involve to process and/or analyse a respective magnitude and/or intensity of the received radar signals or the respective channel impulse response profiles. Phase information of the channel impulse response profiles may not be necessary and may not be utilized in order to identify the target sample time interval. The target sample time interval may for example be identified by forming one or more averages of one or more of the channel impulse response profiles or forming one or more differences of the channel impulse response profiles.

Embodiments of the present invention may in particular comprise to detect or determine location and/or movement information of a moving target. For example, by forming a difference between two subsequent channel impulse response profiles may allow to identify a moving target.

The total signal of interest in each of the channel impulse response profiles is defined as the magnitude and phase of the channel impulse response profile exactly at the target sample time interval. Thus, in embodiments of the present invention, each of the total radar signals of interest may be given as a complex number comprising a real part and an imaginary part. This total radar signal of interest may for example be represented as an arrow in a complex coordinate system. Each total radar signal of interest may carry information of the (magnitude/intensity) and phase of a target contribution to the total radar signal of interest, but may also comprise a disturbance contribution, for example a crosstalk contribution due to measurement errors. However, a particular processing as will be explained below may allow to extract the phase of the target contribution. The phase of the target contribution may in particular change due to movement of the target. Movement of the target may give rise to a frequency shift of the transmitted radiation being shifted by a Doppler frequency. The Doppler frequency may be proportional to the velocity of the (moving) target. Integrating the velocity may allow further to determine the location of the target (for example within the target location interval, being derivable from the target sample time interval). In particular, the location and/or movement information of the target may further be based on the target sample time interval. The target sample time interval may be also referred to as target tap in the present application.

The method may for example be configured to comply with the the IEEE 802.15.4 UWB specification. The bandwidth may be at least 500 MHz. According to an embodiment of the present invention, sub-centimeter accuracy of location/movement detection is achieved by utilizing the phase of the target tap. The phase of the target tap may correspond to the phase of the target contribution to the total radar signal of interest being the respective channel impulse response profile at the target sample time interval. Embodiments of the present invention may allow a precise tracking of moving targets at close distances. Embodiments may have several applications including but not limited to time-of-flight estimation for camera autofocus, under the wall imaging, etc.

According to an embodiment of the present invention, the CIR (channel impulse response) phase is used to estimate target motion in the sub-centimeter accuracy. Embodiments of the present invention may also apply or involve to be applied to radar equipment with high TX to RX leakage, for example involving crosstalk between a transmitter and a receiver. According to an embodiment of the present invention, the CIR phase changes may be separated due to target movement from the self-interference or crosstalk between transmitter and receiver.

The sampling rate may for example be between 0.5 ns and 2 ns, substantially at 1 ns. Peak finding, for example finding the target sample time interval may be based on the mean CIR profile within a window (for example time window). According to embodiments of the present invention, the target is acquired (for example involving) determining the target sample time interval in the channel impulse response profiles and the phase changes in the target tap are used to detect movement and estimate the changing distance/location of the target.

According to an embodiment of the present invention, evaluating the total radar signals of interest comprises determining, for each of the total radar signals of interest, the associated phase of the target contribution to the respective total radar signal of interest, wherein determining the location and/or movement information of the target is based on the phases of the target contribution to all of the respective total radar signals of interest, wherein each channel impulse response profile in particular defines magnitude and phase of the received radar signals for some of the plural sample time intervals.

According to this embodiment, for all total radar signals of interest, the associated target phase is determined and all the determined target phases are utilized to determine the location and/or movement information of the target. Determining, for all total radar signals of interest, the target phase may accurately allow tracking the target as it moves. Thereby, location and/or movement information may be determined in a more accurate manner.

According to an embodiment of the present invention, determining the location and/or movement information of the target comprises using the target sample time interval to derive a target location interval and using at least one phase of the at least one target contribution to estimate movement and/or position of the target within the target location interval.

The target sample time interval may be the time interval at which the radar radiation having been reflected at the target is received at an antenna for example. The target sample time interval may allow, due to the known propagation velocity of the radiation (by the velocity of light), to derive a location interval in which the target is located. Thus, the target sample time interval may allow to roughly estimate the position of the target being accurate only by the extension of the respective target location interval. Additionally, using the phase of the target contribution may allow to more accurately determine the location of the target and/or movement of the target, e.g. within the target location interval.

According to an embodiment of the present invention, each of the total radar signals of interest comprises a disturbance (e.g. crosstalk) contribution, being a contribution due to back coupling and/or crosstalk between a transmitter, transmitting the pulses, and a receiver, receiving the radar signals; the target contribution, being a contribution due to interaction and/or reflection of the transmitted pulses at the target.

Each of the total radar signals of interest may comprise an disturbance contribution, in particular comprising a crosstalk contribution. Any contribution not being associated due to target reflection of radar signals may be considered as a disturbance contribution. The disturbance contribution may hamper the determination of the location and/or movement of the target. According to embodiments of the present invention, the respective disturbance contribution, in particular the crosstalk contribution, may be determined and subtracted from the total radar signals of interest, in order to determine the target contribution, from which the location and/or movement information of the target may be derived. The disturbance contribution or in particular the crosstalk contribution may have a higher magnitude than the target contribution. According to embodiments of the present invention, the magnitude and/or phase of the crosstalk contribution or in general any disturbance contribution may be assumed to be substantially constant across the multiple total radar signals of interest. When the crosstalk contribution or in general any disturbance contribution is subtracted from each of the total radar signals of interest, the target contribution may be determined advantageously allowing to be utilized for location and/or movement determination of the target.

According to an embodiment of the present invention, evaluating total radar signals of interest comprises determining the crosstalk contribution by processing the plural total radar signals; subtracting the crosstalk contribution from each of the total radar signals of interest, in order to derive the target contributions, each comprising at least a target phase and in particular a target magnitude.

When the target is for example moving in one direction, the target phase is expected to change in a linear manner with time. For example, every two Pi angle change of the target phase may correspond to a movement of the target along a length of $\lambda/2$, wherein $\lambda$ is the center wavelength of the transmitted radar radiation. If the averaging is across the phase change where the phase change is 2 * Pi, the averaging of the plural radar signals of interest may result in a vector which is located at a center of a circle, the center of the circle representing the crosstalk contribution and the circle corresponding to the movement of the target. After subtracting the approximate crosstalk contribution from the total radar signals of interest, an approximate target contribution may be derived. The approximately target contributions may then further be processed in order for example to determine a time window in which due to the movement of the target, a full circle of the phase change of the target is covered.

According to an embodiment of the present invention, determining the crosstalk contribution by processing the plural total radar signals comprises forming cumulative phases of the approximate target phases over different cumulative phase time ranges; determine a cumulative phase time range of interest (as one of the cumulative phase time ranges), where the cumulative phase of the approximate target phases satisfies a criterium, in particular being substantially or at least 2 * Pi or 4 * Pi.

This embodiment may be performed when or after the approximate crosstalk contribution has been determined. In this embodiment, a refinement of the determination of the crosstalk contribution or in general the disturbance contribution may be achieved. When for example a target moves in one direction, it may be determined when the cumulative phases amount to at least 2 * Pi or 4 * Pi. The time range at which the target phase is in an accumulated manner substantially 2 Pi or 4 Pi is referred to as the cumulative phase time range of interest. For example, after having determined the cumulative phase time range of interest, the total radar signals of interest may be averaged over the cumulative phase time range of interest in order to more accurately determine the disturbance contribution or in general the crosstalk contribution.

According to an embodiment of the present invention, the method comprises, if the cumulative phase of the approximate target phases does not satisfy the criterium: acquiring further radar measurement data and determining further total radar signals; determining further cumulative phase time ranges, until a further cumulative phase time range of interest satisfies the criterium.

If the criterium is not satisfied, the target contribution may not have been run through a full circle. Thus, considering further radar signals may be necessary, until it is determined that the target contribution runs through a full circle.

According to an embodiment of the present invention, determining the crosstalk contribution further comprises fitting the plural total radar signals of interest across the cumulative phase time interval of interest onto a predetermined curve shape, in particular an arc or a circle or a spiral, the curve shape being associated with a curve center, in particular center of a circle or spiral; setting the crosstalk contribution to the curve center.

In an ideal phase, when the disturbance contribution is substantially constant across the plural radar signals of interest and if the target moves in a same direction across the cumulative phase time interval (over which the phase change satisfies a criterion, in particular being at least 2 Pi or 4 Pi), the total radar signals of interest across the cumulative phase time interval should lie on a circle. The circle center may then represent the disturbance contribution or in particular the crosstalk contribution. A circle is traced by the disturbance contribution if the object moves by a distance of $\lambda/2$ in one direction, and for the 6-8 GHz frequency range, $\lambda/2$ corresponds to 1 to 2 cm. The magnitude of the disturbance contribution, which is due to reflection from a target, does not therefore significantly change, while the phase goes through a 2 Pi change, thus tracing a circle.

According to an embodiment of the present invention, if the target phase indicates that target has moved such that its radar signals are received in another target time interval and/or another target sample time interval is identified in the identifying step, the method comprises evaluating other total radar signals of interest, associated with the other target time interval; determining another crosstalk contribution in the other total radar signals of interest by approximation and/or curve shape fitting; deriving other target phases; deriving another target location/movement based on the other target time interval and/or the other target phases.

The previously described determination of the disturbance contribution (for example involving determination of the cumulative phase time interval of interest and averaging the total radar signals of interest across the cumulative phase time interval) may have been performed considering an unchanged target sample time interval. The embodiment considered here applies to the situation, when the target has moved out of the (previously determined) target sample time interval. In this situation, the determination of the disturbance contribution may be redone with the other target time interval. Thus, the previously disclosed or explained method steps may be in a similar or same manner applied associated with the another target time interval. Therefore, the method may support tracking the target across plural different target time intervals (being associated with plural different target location intervals).

According to an embodiment of the present invention, identifying the target sample time interval comprises forming at least one difference between channel impulse response profiles, in particular relative to a reference impulse response profile, and/or forming an average over plural channel impulse response profiles; performing peak finding in the at least one difference and/or in the average.

The target sample time interval may be identified in a conventional manner. In particular, the differences of the magnitudes between channel impulse response profiles and/or forming an average over magnitudes of the plural channel impulse response profiles may be performed, without considering any phase information. Further, the peak finding may be applied to the respective magnitudes of the difference and/or of the average.

According to an embodiment of the present invention, a channel impulse response profile is formed as an average of received signals in accordance with a code according to which the pulses are transmitted; wherein forming plural subsequent channel impulse response profiles from the received radar signals comprises at least one of removing a carrier radiation contribution; demodulating the received radar signals, in order to extract in-phase (I) components and quadrature (Q) components.

Channel impulse response profiles may be formed in a conventional manner. The channel impulse response profiles may be formed in accordance or respecting the manner in which the radar pulses are transmitted towards the target. Demodulating the received radar signals may thereby result in two components, a real component and an imaginary component.

According to an embodiment of the present invention, at least one of the following holds: the target is moving in one direction or is moving back and forth; the radar signals are received at a rate between 0.5 and 2 GHz, in particular at substantially 1 GHz corresponding to a sample interval width of 30 cm; a pulse width of the transmitted radar pulses is between 0.5 ns and 2 ns, in particular substantially 1 ns; the method adhering to IEEE 802.15.4, at least the version corresponding to the priority date of this application. Thereby, conventional systems and methods may be supported. Furthermore, the demodulation may be performed by a conventional method. Thereby, the method may be simplified.

According to an embodiment it is provided a method of performing a radar measurement, the method comprising: transmitting plural UWB radar radiation pulses towards a target; receiving, at plural subsequent sample time intervals, radar signals due to reflection and/or interaction of the transmitted pulses at the target; performing a method of evaluating radar measurement data according to one of the preceding claims.

The method may utilize a transmitter involving a transmitter antenna and may also involve utilizing a receiver, such as a receiver antenna adapted to receive the radar signals.

The determined location and/or movement information may be used for at least one of: camera autofocus, imaging behind a wall; breathing detection; heart beat detection and so forth.

It should be understood, that features, individually or in any combination, disclosed, explained, provided or applied to a method of evaluating a radar measurement data may also, individually or in any combination, be applied, provided for an arrangement for evaluating a radar measurement data and in particular performing a radar measurement.

According to an embodiment of the present invention it is provided an arrangement for evaluating a radar measurement data and in particular performing a radar measurement, the arrangement comprising, in particular, a transmitter adapted to transmit plural UWB radar radiation pulses towards a target; in particular, a receiver adapted to receive, at plural subsequent sample time intervals, radar signals due to reflection and/or interaction of the transmitted pulses at the target; the arrangement at least comprising: a processor adapted: to form plural subsequent channel impulse response profiles, across subsets of the sample time intervals, from the received radar signals; to identify, in each of the plural channel impulse response profiles, one of the plural sample time intervals as a target sample time interval (e.g. target tap) in which received radar signals are comprised originating due to reflection from the target; to evaluate total radar signals of interest, each defined as respective magnitude and phase of the plural channel impulse response profiles at the target sample time interval, in order to determine for at least one total radar signal of interest a phase of a target contribution to the total radar signal of interest; to determine location and/or movement information of the target based at least on the at least one phase of the target contribution.

The aspects defined above and further aspects are apparent from the examples of embodiment to be described hereinafter and are explained with reference to these examples of embodiment. In the following, further exemplary embodiments of the method, the system will be explained to which the invention is not limited.

9

Figures 6A, 6B, 6C, 6D, 7:
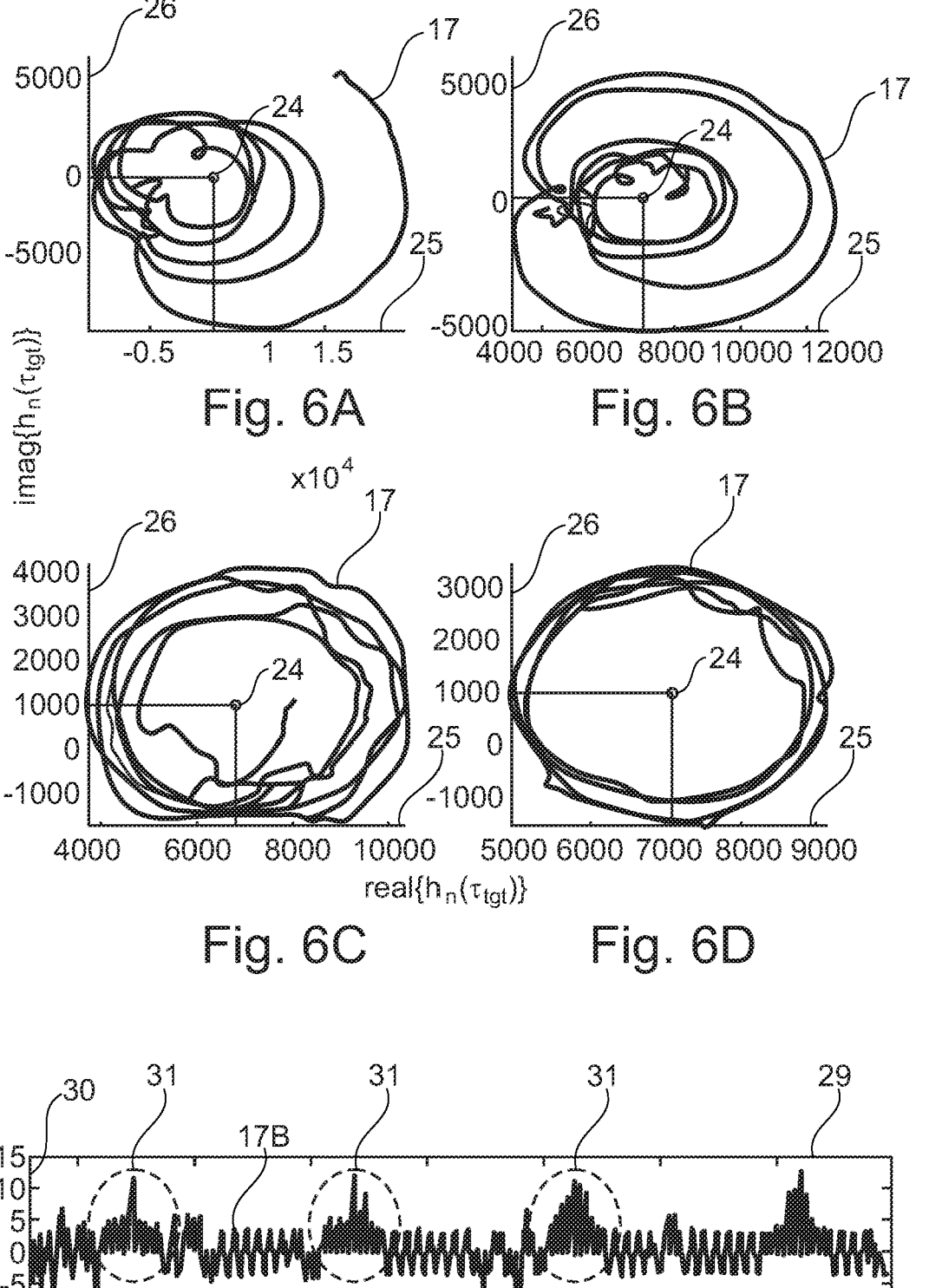
FIGS. 6A, B, C, D illustrate finding a center of a curve according to embodiments of the present invention.
Figure 8:
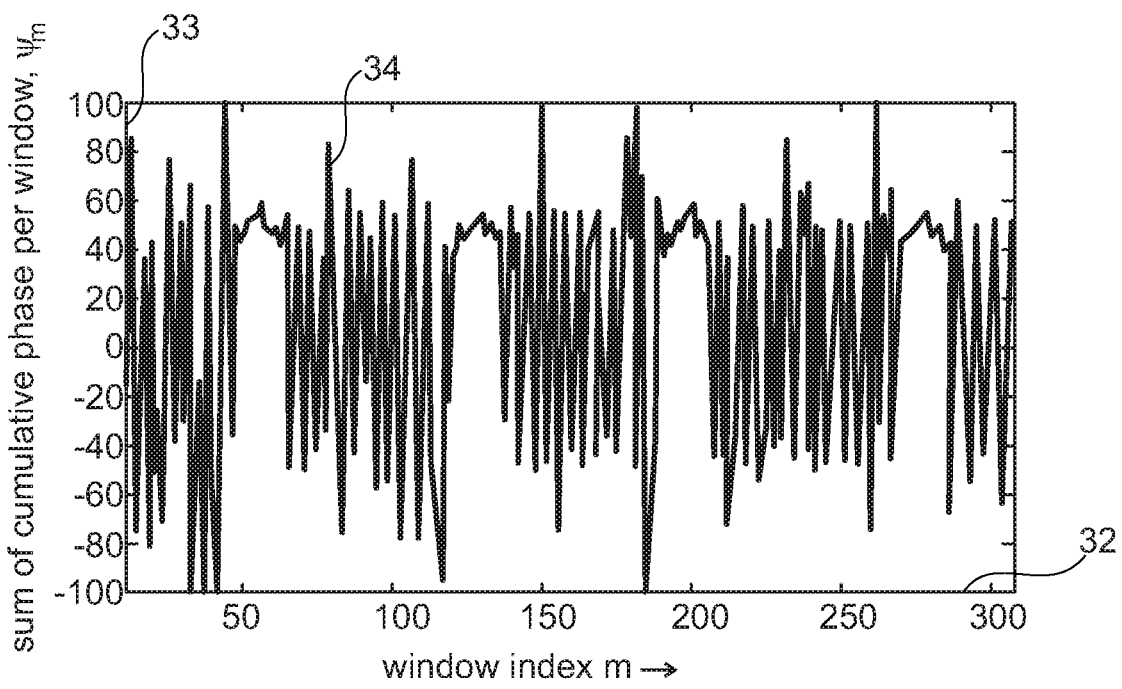
Figure 9:
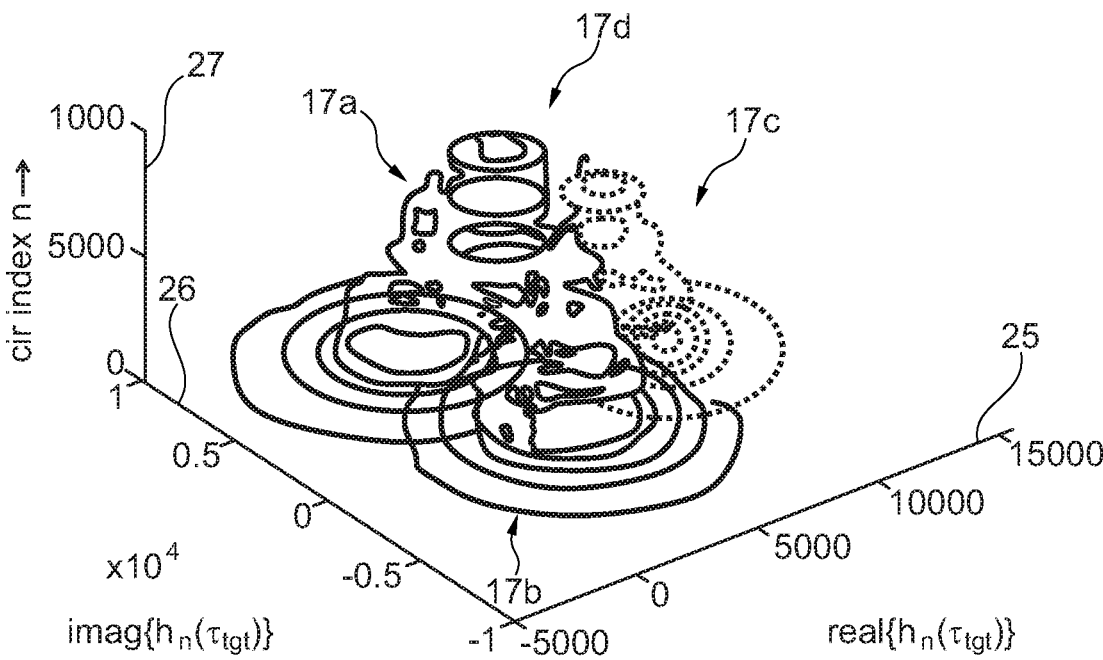
Figure 10:
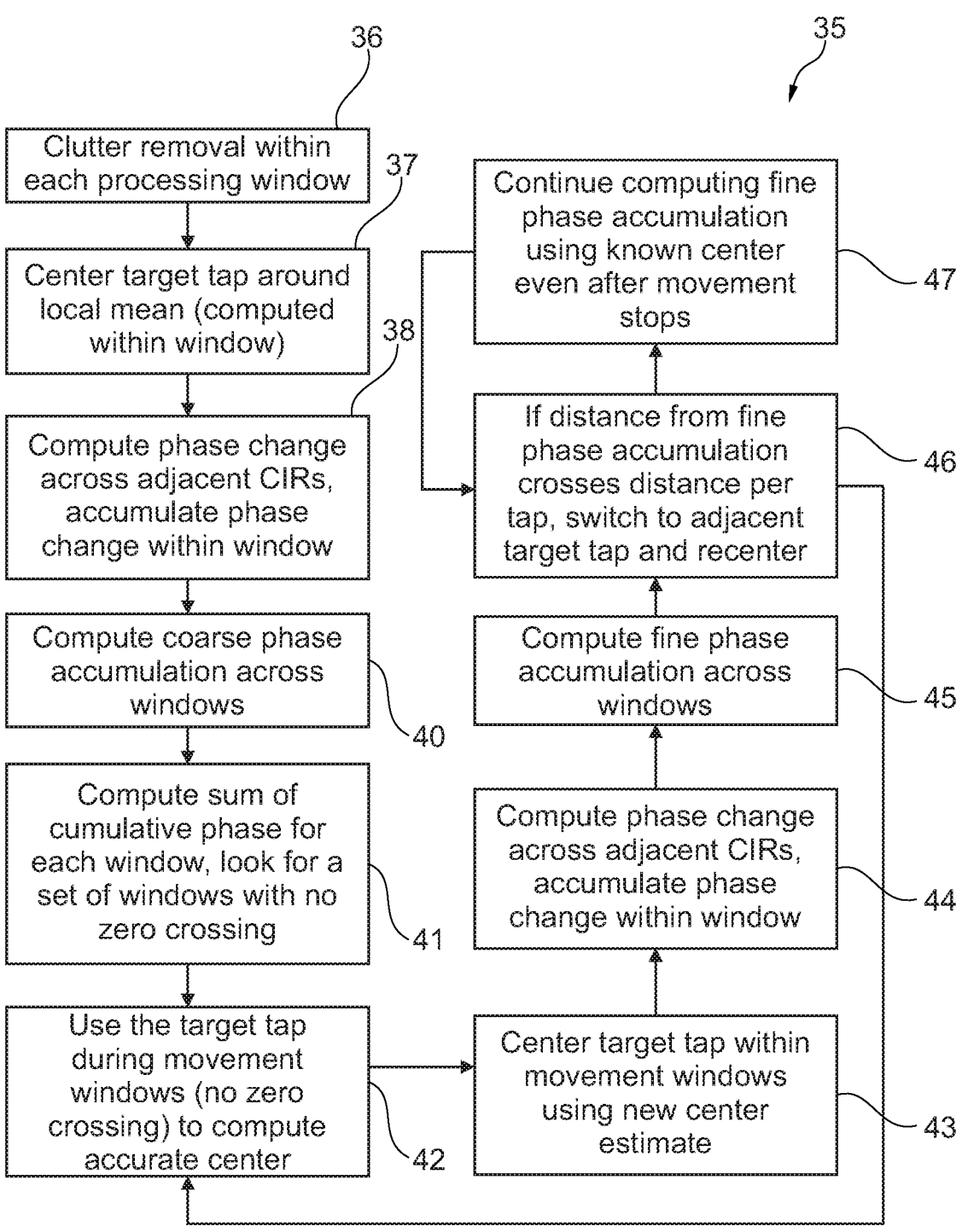
Figure 11:
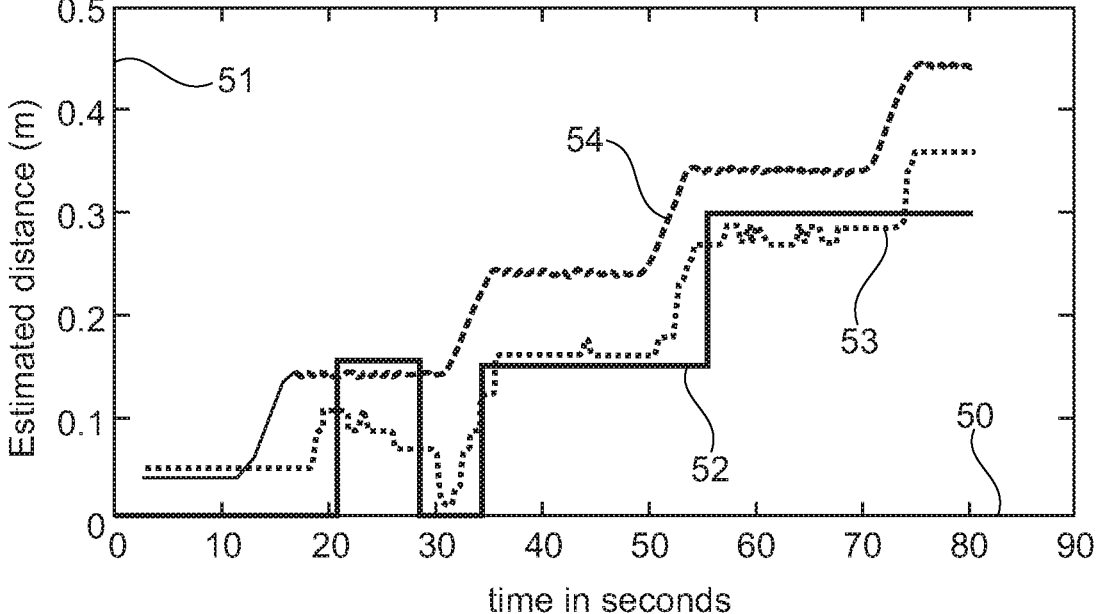

FIG. 7 illustrates cumulative phase difference within a measurement window plotted across time which shows that when target is moving in one direction, there are no zero crossings in this signal, but when target moves back and forth, there are zero crossings;

FIG. 8 illustrates sum of cumulative phases as determined according to embodiments of the present invention;

FIG. 9 illustrates a time evolution of a channel impulse response during target movement as considered according to an example;

FIG. 10 illustrates a method scheme according to an embodiment of the present invention; and FIG. 11 illustrates evaluation results compared to conventional methods.

DETAILED DESCRIPTION OF EXEMPLARY
EMBODIMENTS

Figures 1, 2, 3:
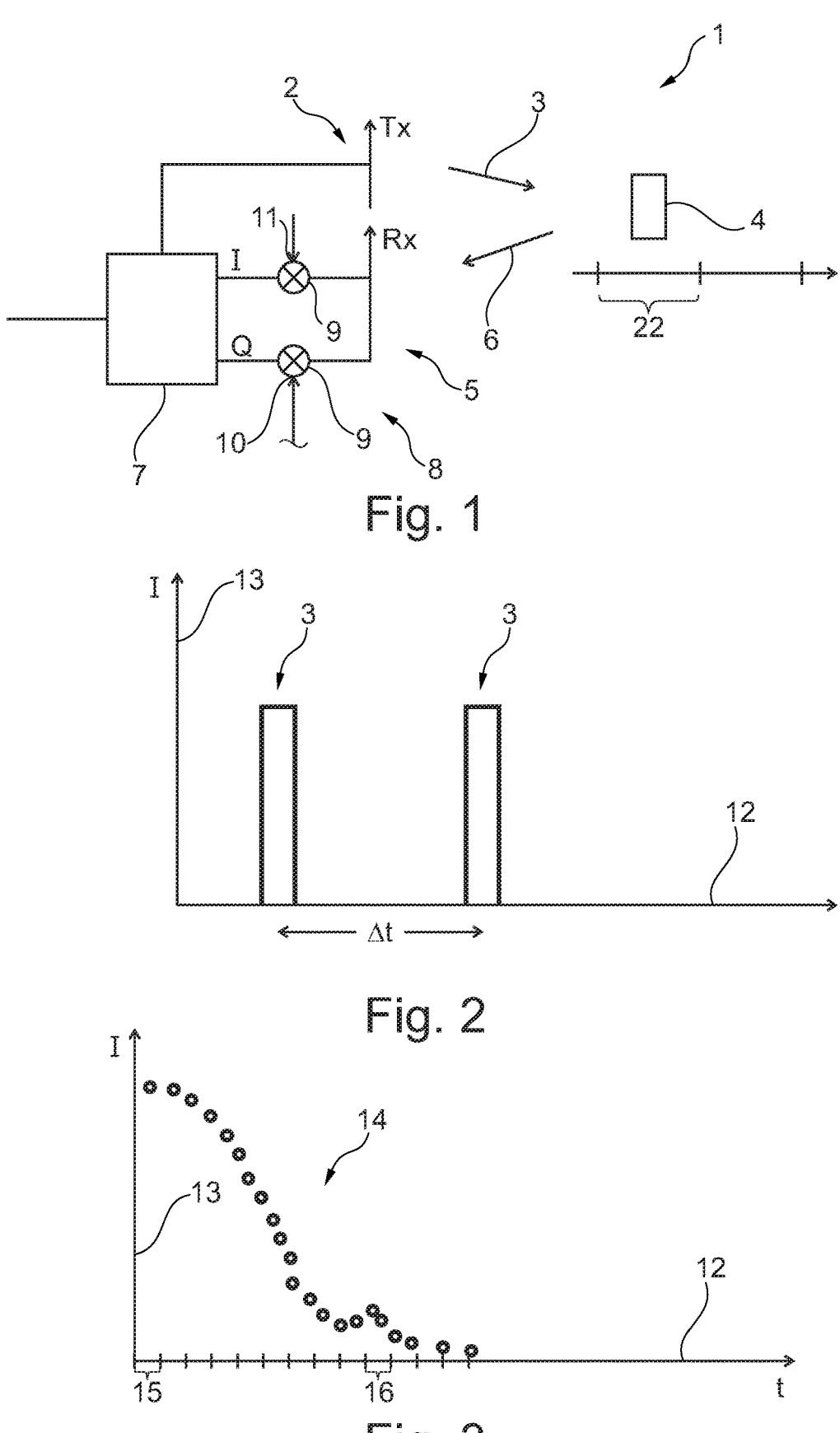
FIG. 1 schematically illustrates an arrangement for performing a radar measurement and also for evaluating a radar measurement according to an embodiment of the present invention.
FIG. 2 schematically illustrates pulses transmitted according to an embodiment of the present invention towards a target.
FIG. 3 illustrates an example of a channel impulse response profile as evaluated according to embodiments of the present invention.

The arrangement 1 for performing a radar measurement according to an embodiment of the present invention schematically illustrated in FIG. 1 comprises in particular a transmitter 2 (Tx) which is adapted to transmit plural UWB radar radiation pulses 3 towards a target 4. The arrangement 1 further comprises a receiver 5 (Rx) which is adapted to receive, at plural subsequent sample time intervals, radar signals 6 which are due to reflection and/or interaction of the transmitted pulses 3 at the target. The arrangement 1 further comprises a processor 7 which is adapted to perform a method of evaluating radar measurement data according to an embodiment of the present invention.

In the embodiment illustrated in FIG. 1, the receiver 5 comprises also an I/Q demodulator 8 which is adapted to demodulate the received radar signals in order to determine an in-phase component I and a quadrature component Q. Thereby, multiplication elements 9 are provided which multiply the received signals by a sine 10 of the carrier frequency (times the time) and a cosine 11 of the carrier frequency (times the time) in order to obtain the in-phase component I and the quadrature component Q, respectively. Both components I and Q are received by the processor 7.

FIG. 2 illustrates in a coordinate system having an abscissa 12 indicating time and having an ordinate 13 indicating an intensity or magnitude the pulses 3 as transmitted by the transmitter 2 illustrated in FIG. 1. The pulses 3 may for example be transmitted at regular time intervals such that the time spacing Δt is for example constant between subsequent pulses 3.

FIG. 3 illustrates in a coordinate system having an abscissa 12 indicating the time delay and having an ordinate 13 indicating the intensity, an example of a channel impulse response profile 14 which is formed by the processor 7 illustrated in FIG. 1 from plural radar signals across subsets of plural subsequent sample time intervals, the plural sample time intervals being labelled with reference sign 15. In particular, the width of the sample interval 15 may be much smaller than the time interval Δt at which the pulses are subsequently transmitted. The channel impulse response profile 14 an example of which is illustrated in FIG. 3 may be for example obtained by averaging multiple reflected pulses 3 which are reflected at the target 4.

The processor 7 is adapted to perform a method of evaluating radar measurement data, first forming plural subsequent channel impulse response profiles (an example of which is illustrated in FIG. 3) from the received radar signals 6. The processor further is configured to identify in each of the plural channel impulse response profiles, one of the plural sample time intervals 15 as a target sample time interval 16 in which received radar signals 6 are comprised originating due to reflection from the target 4. As can be appreciated from FIG. 3, the exemplary channel impulse response profile 14 exhibits relatively high intensity at the first sample time intervals which slowly decreases towards higher sample time intervals. In the target sample time interval 16, however, the intensity slightly increases which can be detected for example by evaluating differences between subsequent channel impulse response profiles or forming averages of such channel impulse response profiles. The slightly increased intensity in the target sample time interval 16 is due to reflection of radiation from the target 4.

FIG. 3 illustrates thereby only a magnitude of the plural channel impulse response. However, as has been explained with respect to FIG. 1, the processor 7 not only receives the in-phase signal I, but also the quadrature signal Q, thus magnitude and also phase of the radar signals 6 are obtained by the processor 7. The processor 7 is then configured to determine for at least one total radar signal of interest a phase of a target contribution to the total radar signal of interest. Based on the at least one phase of the target contribution, the processor 7 is then further configured to determine location and/or movement information of the target.

Figure 4:
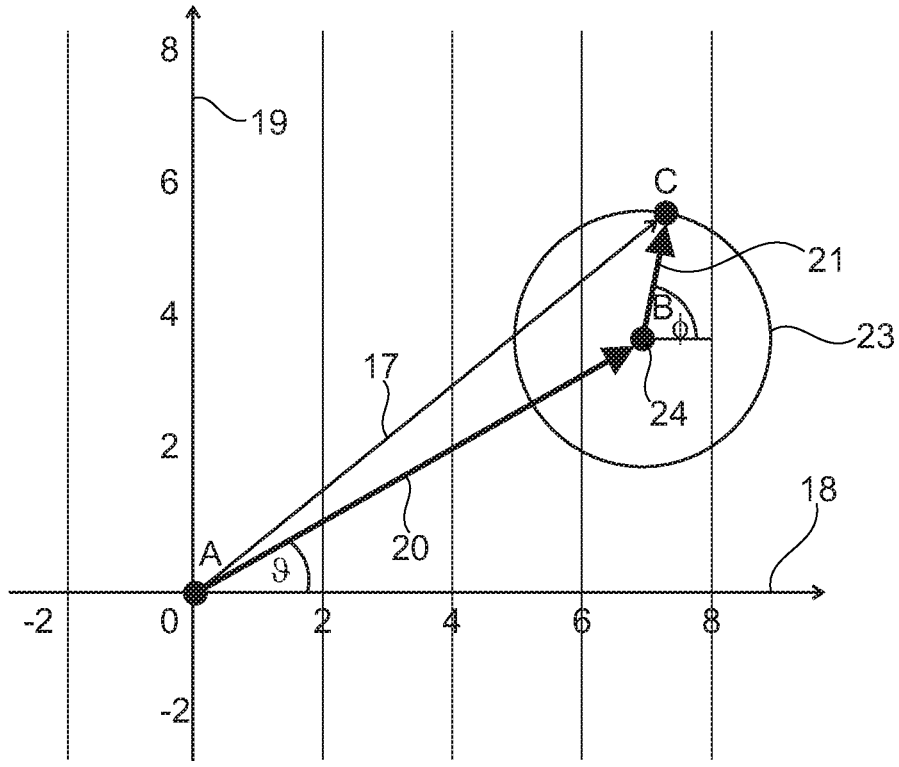
FIG. 4 illustrates a total radar signal of interest as considered in embodiments of the present invention.

FIG. 4 illustrates a total radar signal of interest as considered in embodiments of the present invention and being processed by the processor 7. The total radar signal of interest 17 (comprising magnitude and phase of the CIR at the target sample time interval 16) is illustrated in a complex coordinate system having a real axis 18 and an imaginary axis 19. The total radar signal of interest 17 comprises a disturbance contribution or crosstalk contribution 20 being a contribution due to disturbance or back coupling and/or crosstalk between a transmitter 2 and a receiver 5 for example or which may be due to other measurement errors. The total radar signal of interest further comprises a target contribution 21 being a contribution due to interaction and/or reflection of the transmitted pulses 3 at the target 4.

The target sample time interval 16 can then be used to determine a target location interval 22 being one of plural possible location intervals of the target 4 (see FIG. 1, 3). The target location interval 22 together with the phase (1) of at least one target contribution 21 is then utilized by the processor 7 to estimate movement and/or position of the target within the target location interval 22. When the disturbance contribution 20 of the total radar signal of interest 17 is assumed to be (at least approximately) constant and the target is moving in a same direction in a linear manner for a particular distance, the target contribution 21 would describe a circle 23 in the coordinate system illustrated in FIG. 4. In order to estimate or determine the disturbance contribution 20 according to embodiments of the present invention the center 24 of the circle 23 is determined. The crosstalk contribution 20 is then subtracted from the total radar signal of interest 17 in order to derive the target contribution 21. The center 24 of the circle 23 may also be determined by averaging (and/or fitting) the total radar signal of interest 17 across a particular averaging time range which is selected or determined such that in fact the target contribution describes a full circle around the center 24.

Below, particular details according to embodiments of the present invention are provided. However, the invention is not restricted to the explained and disclosed details:

Phase Tracking

The doppler motion is encoded in the CIR phase. Transmitting pulses according to $\cos(2\pi f_c t)$, we would receive $\cos(2\pi(f_c + f_d)t) = \cos(2\pi f_c t + \varphi(t))$ at the receiver, where the phase $\varphi(t) = 2\pi f_d t$ depends on the doppler frequency $f_d$ After removing the carrier, this phase will modulate the CIR. We look at the phase change over a given time, $$\phi(\Delta t) = 2\pi f_d \Delta t = 2\pi f_c \left(\frac{v}{c}\right) \Delta t = 2\pi \left(\frac{f_c}{c}\right)(2\Delta d)$$

where $\Delta d = v\Delta t/2$ is the distance the target 4 has moved in the given time.

We then get $$\Delta d = \left(\frac{\lambda}{4\pi}\right) \times \phi(\Delta t),$$

so every $2\pi$ angle change corresponds to $\lambda/2$ movement of the target

A key problem is finding $\varphi(t)$, since what we have is a phasor representing the reflected signal modulating the phasor from TX-RX leakage.

The angle of the resultant phasor is no longer $\varphi(t)$, but is $\angle(\rho e^{j\varphi(t)} + re^{j\theta})$ The complex phasor $$\left(\rho e^{j\phi(t)} + r e^{j\theta}\right) = \rho_s\left(e^{j\theta} + \frac{\rho}{r}e^{j\phi(t)}\right)$$

indicates that if the reflected signal power is much smaller than the leakage power at any given tap, it gets harder to extract $\varphi(t)$ To extract $\varphi(t)$, we then need to separate the two phasors Taking one time instance t o as a reference does not help, since that gives us $\rho e^{j\varphi(t_0)} + re^{j\theta}$ and subtracting that from the time varying phasor, we have $\rho(t)e^{j\varphi(t)} - \rho(t_0)e^{j\varphi(t_0)}$ and there is no way to get to $\varphi(t)$ from this either since we don't know $\rho(t_0)e^{j\varphi(t_0)}$

Circle Fitting and Finding the Center

One way to estimate the static phasor $c_I + jc_Q$, is to build a system of equations and solve for the unknowns With $(x_I(t) + jx_Q(t)) = (c_I + jc_Q) + \rho(t) \times (\cos \varphi(t) + j \sin \varphi(t))$, we have no way to do that since we have 4 unknowns and cannot get a rank-4 matrix that we can invert regardless of how many observations we collect We can however use the fact that the static phasor forms the center of the arc/circle/spiral the signal phasor traces out as it changes over time We have $(x_I(t) - c_I)^2 + (x_Q(t) - c_Q)^2 = \rho^2(t)$, and if we have 3 points where $\rho(t) = \rho$, which is still unknown, but remains constant, we can form the following system of equations to estimate $c_I + jc_Q$, $$\left(x_I(t_1) - c_I\right)^2 + (x_Q(t_1) - c_Q)^2 - \left((x_I(t_0) - c_I)^2 + (x_Q(t_0) - c_Q)^2\right) =$$

$$(x_I(t_2) - c_I)^2 + (x_Q(t_2) - c_Q)^2 - \left((x_I(t_0) - c_I)^2 + (x_Q(t_0) - c_Q)^2\right) = 0$$

$$\frac{\left(x_I^2(t) - x_I^2(t_0)\right) + \left(x_Q^2(t) - x_Q^2(t_0)\right)}{2} = (x_I(t) - x_I(t_0))c_I + (x_Q(t) - x_Q(t_0))c_Q$$

Which simplifies to:

For $t = t_1$ and $t = t_2$, this gives us two equations in two unknowns that we can solve for Note however that the choice of $t_0$, $t_1$ and $t_2$ are critical for this approach. If we pick then too close, then we get an ill-conditioned matrix that we have to invert. If we pick them too far, the assumption that $\rho(t) = \rho$ is not strictly true.

By the circle fitting, the center 24 can be found. The accuracy of the center determination and the distance errors depend on the accuracy of the disturbance contribution determination 20. This in turn influences the accuracy of phase tracking of the target phase. Due to the particular movement manner of the target, the target may move only in an arc segment and not in a full circle. According to embodiments of the present invention, it is determined when the target contribution 21 runs through at least a full circle. Below, some particular details are given in order to identify the target sample time interval 16 also referred to as "target tap" and to determined cumulative phases:

Use the clutter removed CIR to identify the target tap $h_{ref}(\tau) = h_{m\cdot(L_{win}-L_{ovlp})}(\tau)$ where $m = 0,1,2, \ldots$ $\check{h}_n(\tau) = h_n(\tau) - h_{ref}(\tau)$ with $n = m \cdot (L_{win} - L_{ovlp}) + \ell$ being the absolute time index and $\ell = 1,2, \ldots, L_{win}$ being the index within each window $$\tau_{tgt} = \max_{\tau,m} \left|\check{h}_n(\tau)\right|$$

or use a target peak finding algorithm such as one used for vital signs detection With $h_n(\tau) = h_s(\tau) + h(t, \tau)$, we have:

$h_{ref}(\tau) = h_s(\tau) + h(t_0, \tau)$ and $\check{h}_n(\tau) = h(t, \tau) - h(t_0, \tau) = \rho(t)$
$e^{j\varphi(t)} - \rho(t_0)e^{j\varphi(t_0)}$ Estimate phase change $\check{\varphi}(\Delta t)$ within each window m by using the clutter removed CIR $\check{h}_n(\tau)$, and using mean tap within that window to estimate the center:

$\check{c}_m(\tau_{tgt}) = E\{\check{h}_n(\tau)\}$ where $E\{\}$ is the expectation operator $\tilde{\rho}(t)e^{j\check{\phi}(t)} = \tilde{h}(t, \tau_{tgt}) = \check{h}_n(\tau_{tgt}) - \check{c}_m(\tau_{tgt})$, and $$\check{\phi}(\Delta t) = \angle\left(\frac{\tilde{\rho}(t)e^{j\check{\phi}(t)}}{\tilde{\rho}(t + \Delta t)e^{j\check{\phi}(t+\Delta t)}}\right),$$

and the cumulative sum $$\tilde{\varphi}_m(\ell) = \sum_1^\ell \check{\phi}(\Delta t)$$

where $t = n \cdot T_{RIFR}$ and the coarse accumulated phase at the end of every window is $$\tilde{\varphi}_m = \sum_1^m \check{\phi}_m(L_{win})$$

Figure 5:
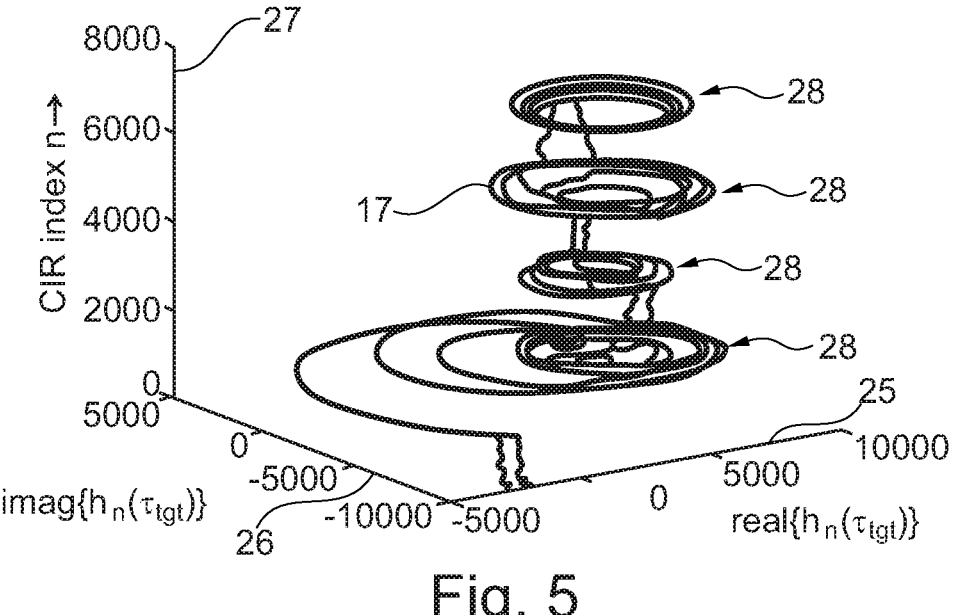
FIG. 5 illustrates an evolution of a total radar signal of interest as evaluated according to embodiments of the present invention.

Though this will cause incorrect angle estimation, the direction in which the accumulated phase moves will be maintained Sum the cumulative phase changes in each window:
$\psi_m = \Sigma_\ell \check{\phi}_m(\ell)$ FIG. 5 illustrates in a three-dimensional coordinate system having a real axis 25 and imaginary axis 26 and an axis 27 indicating the index of the channel impulse response profile the target CIR tap evolution across time. Between the different layers 28, the target moves farther by 10 cm.

FIGS. 6A, B, C, D illustrate in coordinate systems having a real axis 25 and an imaginary axis 26 evolution of total signals of interest 17 and an iterative determination of approximate or accurate centers 24 during different phases of movement of the target 4. The curves 17 illustrate the evolvement of the total radar signal of interest during the different movement phases.

FIG. 7 illustrates the cumulative phase 17P of the total radar signal of interest across plural channel impulse response profiles whose index is indicated in the abscissa 29. The cumulated phase of the total radar signal of interest is indicated along the ordinate 30.

The sum of cumulative phase change within each window, $\psi_m$, will show multiple zero crossing across windows if the movement is periodic (short to and from movement such as breathing) and will be always positive or negative for several consecutive windows if the target moves closer or farther away.

Use the zero crossing to detect time instances when the target is moving in one direction Check the coarse accumulated phase $\hat{\varphi}_m$ to see if it has crossed $4\pi$ rotation.

Even though the accumulated phase across windows, $\tilde{\varphi}_m$, is under or over estimated due to incorrect center, we would at least have either one full revolution of the signal phasor, or more than 2 revolutions Use the mean of $h_n(\tau_{tgt})$ across this movement window to estimate the center. Since we are likely to have a full circle, center estimation is accurate.

Use the center to remove the static phasor and accumulate angles to map to distance movement Update center as long as we have movement, but update only if the accuracy doesn't drop.

The multiple subsequent channel impulse responses at the target sample time interval (in particular) is evaluated and the zero crossings or crossing is used to detect time window when the target is moving in one direction. Between the circled regions 31, the target moves farther by 10 cm.

FIG. 8 shows in a coordinate system having an abscissa 32 indicating the time window index m and having an ordinate 33 indicating the sum of the cumulative phase per window, the sum of cumulative target phase represented by a curve 34. As seen here, during the windows where there is a target movement on one direction (see the circles traced in FIG. 5), we see that there are no zero crossings. In all the other windows indices, the cumulative phase per window crosses zero several times.

FIG. 9 illustrates in a three-dimensional coordinate system having a real axis 25, an imaginary axis 26 and an axis 27 indicating the CIR index, the time evolution of the CIR tap (e.g. corresponding to a total signal of interest 17) during the target movement. The portion 17a, 17b, 17c, 17d illustrate the total radar signal of interest, wherein different target time sample intervals are occupied or used such that the target moves during the entire evolution from one target sample time interval to an adjacent interval and so forth. For each of the portions 17a, 17b, 17c, 17d, a centering algorithm may be performed.

Recentering Across Taps

As the accumulated phase grows beyond 15 cm, looking at the time evolution of the target tap is suboptimal, since the peak due to target is now captured in the adjacent tap.

But switching to the adjacent tap means computing the center again

Recentering is done by computing the center again during the movement window

FIG. 10 illustrates a method scheme 35 as applied or performed according to embodiments of the present invention. In a method step 36, clutter removal within each processing window of the received radar signals is performed.

In a method step 37, the target tap is centered around the local mean (computed within the window).

In a method step 38, the phase change across adjacent CIRs is computed, accumulated and the phase change within the window is accumulated.

In a method step 40, the coarse phase accumulation across windows is computed.

In a next method step 41, the sum of the cumulative phase for each window is computed, wherein it is looked for set of windows with no zero crossings.

In a method step 42, the target tap during movement windows (no zero crossings) is used to compute the accurate center (of the disturbance contribution).

In a next method step 43, the target tap is centered within movement windows using the new center estimate.

In a next method step 44, the phase change across adjacent CIRs is computed, and the phase change is accumulated within window.

In a next method step 45, the fine phase accumulation across windows is computed.

In a next method step 46, it is checked if the distance from the fine phase accumulation crosses distance per tap crosses tap. If this is the case, it is switched to an adjacent target tap and it is recentered.

The method step 46 then refers back to method step 42 which again leads to subsequent method steps 43, 44, 45 and again to step 46.

If method step 46 evaluates to false, then in a method step 47 (if the target moves <15 cm in one direction and then stops to perform a periodic motion, then step 47 is performed), the fine phase accumulation using known center even after movement stops is continued. The method step 47 leads back to method step 46.

According to embodiments of the present invention, one or more method steps illustrated in FIG. 10 may be omitted.

FIG. 11 illustrates, in a coordinate system having an abscissa 50 indicating time and having an ordinate 51 indicating the estimated distance, a conventional peak finding methodology 52 (on 1 ns tap), a peak finding 53 with a time interpolation and a phase tracking for distance estimation 54 as obtained according to embodiments of the present invention. Thereby, a robot was breathing from 5 cm to 45 cm in 10 cm steps. As can be appreciated from FIG. 11, the curve 54 representing the results according to embodiments of the present invention accurately determines the movement of the robot and also the locations of the robot being 10 cm spaced apart.

Thus, embodiments of the present invention provide a sub-centimeter accuracy for movement tracking at close distances while even eight times interpolation with peak finding is not accurate enough. According to embodiments of the present invention, in particular linear motion is tracked very well by estimating the distance using phase much better than conventional peak finding algorithms.

Conventional target detection may use the CIR magnitude; phase information, however, is ignored. In particular, a phase is not usable directly in systems with practical limitations such as high TX leakage and CIR drift across temperature.

According to embodiments of the present invention, an algorithm is disclosed that makes use of the CIR phase to estimate target motion in sub-centimeter accuracy. The method may even work in case of radar devices with practical limitations, such as high TX to RX leakage where separating the CIR phase changes due to target movement from the self-interference may become a challenging task.

Embodiments of the present invention allow for the UWB modems radar functionality to be used for applications where high distance estimation accuracy is required, such as under the wall imaging, high resolution range imaging, high accuracy time-of-flight for camera autofocus, etc.

The invention claimed is:

1. A method of evaluating radar measurement data, the method comprising:

forming plural channel impulse response profiles from radar signals received across plural sample time intervals, the radar signals being received due to reflection or interaction of plural ultra-wideband (UWB) radar radiation pulses transmitted towards a target;

identifying, in each of the plural channel impulse response profiles, one sample time interval of the plural sample time intervals as a target sample time interval in which the received radar signals are due to reflection from the target;

evaluating radar signals of interest in the target sample time interval, each of the radar signals of interest defined as respective magnitude and phase of the plural channel impulse response profiles in the target sample time interval, in order to determine a phase of a target contribution of one or more of the radar signals of interest to a total radar signal of interest comprising the radar signals of interest; and determining at least one of a location or movement information of the target based on the phase of the target contribution.

2. The method according to claim 1, wherein evaluating the radar signals of interest comprises:

determining, for each of the radar signals of interest, an associated phase of the target contribution to the respective radar signal of interest, wherein determining the location or movement information of the target is based on the phases of the target contribution for all of the radar signals of interest, wherein each channel impulse response profile defines a magnitude and phase of the received radar signals for a subset of the plural sample time intervals.

3. The method according to claim 1, wherein determining the location or movement information of the target comprises:

using the target sample time interval to derive a target location interval; and using at least one phase of the target contribution to estimate one of a movement or a position of the target within the target location interval.

4. The method according to claim 1, wherein each of the radar signals of interest comprises:

a crosstalk contribution, being a contribution due to back coupling or crosstalk between a transmitter, transmitting the plural UWB radar radiation pulses, and a receiver, receiving the radar signals; and the target contribution, being a contribution due to interaction or reflection of the transmitted plural UWB radar radiation pulses at the target.

5. The method according to claim 4, wherein evaluating the radar signals of interest comprises:

determining the crosstalk contribution by processing the received radar signals; and subtracting the crosstalk contribution from each of the total radar signals of interest, in order to derive the target contribution for each of the radar signals of interest, each target contribution comprising at least a target phase and a target magnitude.

6. The method according to claim 4, wherein the crosstalk contribution is determined by averaging the radar signals of interest over an averaging time range to generate an approximate crosstalk contribution, wherein the approximate crosstalk contribution is subtracted from the radar signals of interest within the averaging time range, in order to derive approximate target contributions within the averaging time range, each approximate target contribution comprising at least an approximate target phase and an approximate target magnitude.

7. The method according to claim 4, wherein determining the crosstalk contribution by processing the radar signals of interest comprises:

forming cumulative phases of the approximate target phases over different cumulative phase time ranges; and determining a cumulative phase time range of interest, where the cumulative phase of the approximate target phases satisfies a criterium.

8. The method according to claim 7, comprising, if the cumulative phase of the approximate target phases does not satisfy the criterium:

acquiring further radar measurement data and determining further radar signals of interest; and determining further cumulative phase time ranges of interest, until a further cumulative phase time range of interest satisfies the criterium.

9. The method according to claim 7, wherein determining the crosstalk contribution further comprises:

fitting the radar signals of interest across the cumulative phase time range of interest onto a predetermined curve shape being associated with a curve center; and setting the crosstalk contribution to the curve center.

10. The method according to claim 1, wherein if the target phase indicates that target has moved such that its radar signals are received in another target sample time interval, the method comprises:

evaluating other radar signals of interest, associated with the other target sample time interval;

determining another crosstalk contribution in the other radar signals of interest by one or more of approximation or curve shape fitting;

deriving other target phases; and deriving another target location or movement based on the other target time sample interval and the other target phases.

11. The method according to claim 1, wherein identifying the target sample time interval comprises:

forming at least one difference between the plural channel impulse response profiles relative to a reference impulse response profile or forming an average over the plural channel impulse response profiles; and performing peak finding in the at least one difference or in the average.

12. The method according to claim 1, wherein a channel impulse response profile of the plural channel impulse response profiles is formed as an average of received signals in accordance with a code according to which the pulses are transmitted;

wherein forming the plural channel impulse response profiles from the received radar signals comprises at least one of:

removing a carrier radiation contribution; or demodulating the received radar signals, in order to extract in-phase components and quadrature components.

13. The method according to claim 1, wherein:

the target is moving in one direction or is moving back and forth;

the radar signals are received at a rate between 0.5 and 2 GHz; or a pulse width of the transmitted plural UWB radar radiation pulses is between 0.5 ns and 2 ns.

14. The method of claim 1, further comprising:

transmitting the plural UWB radar radiation pulses; and receiving, during the plural sample time intervals, the radar signals due to reflection or interaction of the transmitted plural UWB radar radiation pulses at the target.

15. An arrangement for evaluating a radar measurement data, the arrangement comprising:

a transmitter configured to transmit plural ultra-wideband (UWB) radar radiation pulses towards a target;

a receiver configured to receive, at plural sample time intervals, radar signals due to reflection or interaction of the transmitted plural UWB pulses from the target; and a processor configured to:

form plural channel impulse response profiles, across subsets of the plural sample time intervals, from the received radar signals;

identify, in each of the plural channel impulse response profiles, one sample time interval of the plural sample time intervals as a target sample time interval in which the received radar signals are due to reflection from the target;

evaluate radar signals of interest in the target sample time interval, each of the radar signals of interest defined as respective magnitude and phase of the plural channel impulse response profiles in the target sample time interval, in order to determine for a phase of a target contribution of one or more of the radar signals of interest to a total radar signal of interest comprising the radar signals of interest; and to determine at least one of a location or movement information of the target based on the phase of the target contribution.

16. The arrangement according to claim 15, wherein each of the radar signals of interest comprises:

a crosstalk contribution, being a contribution due to back coupling or crosstalk between the transmitter, transmitting the plural UWB radar radiation pulses, and the receiver, receiving the radar signals; and the target contribution, being a contribution due to interaction or reflection of the transmitted plural UWB radar radiation pulses at the target.

17. The arrangement according to claim 16, wherein the crosstalk contribution is determined by averaging the radar signals of interest over an averaging time range to generate an approximate crosstalk contribution, and wherein the approximate crosstalk contribution is subtracted from the radar signals of interest within the averaging time range, in order to derive approximate target contributions within the averaging time range, each approximate target contribution comprising at least an approximate target phase and an approximate target magnitude.

18. The arrangement according to claim 16, wherein the processor is further configured to:

determine the crosstalk contribution by processing the radar signals of interest; and subtract the crosstalk contribution from each of the radar signals of interest, in order to derive the target contributions, each target contribution comprising at least a target phase and a target magnitude.

19. The arrangement according to claim 16, wherein the processor is further configured to:

form cumulative phases of the approximate target phases over different cumulative phase time ranges; and determine a cumulative phase time range of interest, where the cumulative phase of the approximate target phases satisfies a criterium.

\* \* \* \* \*